Figure 1:
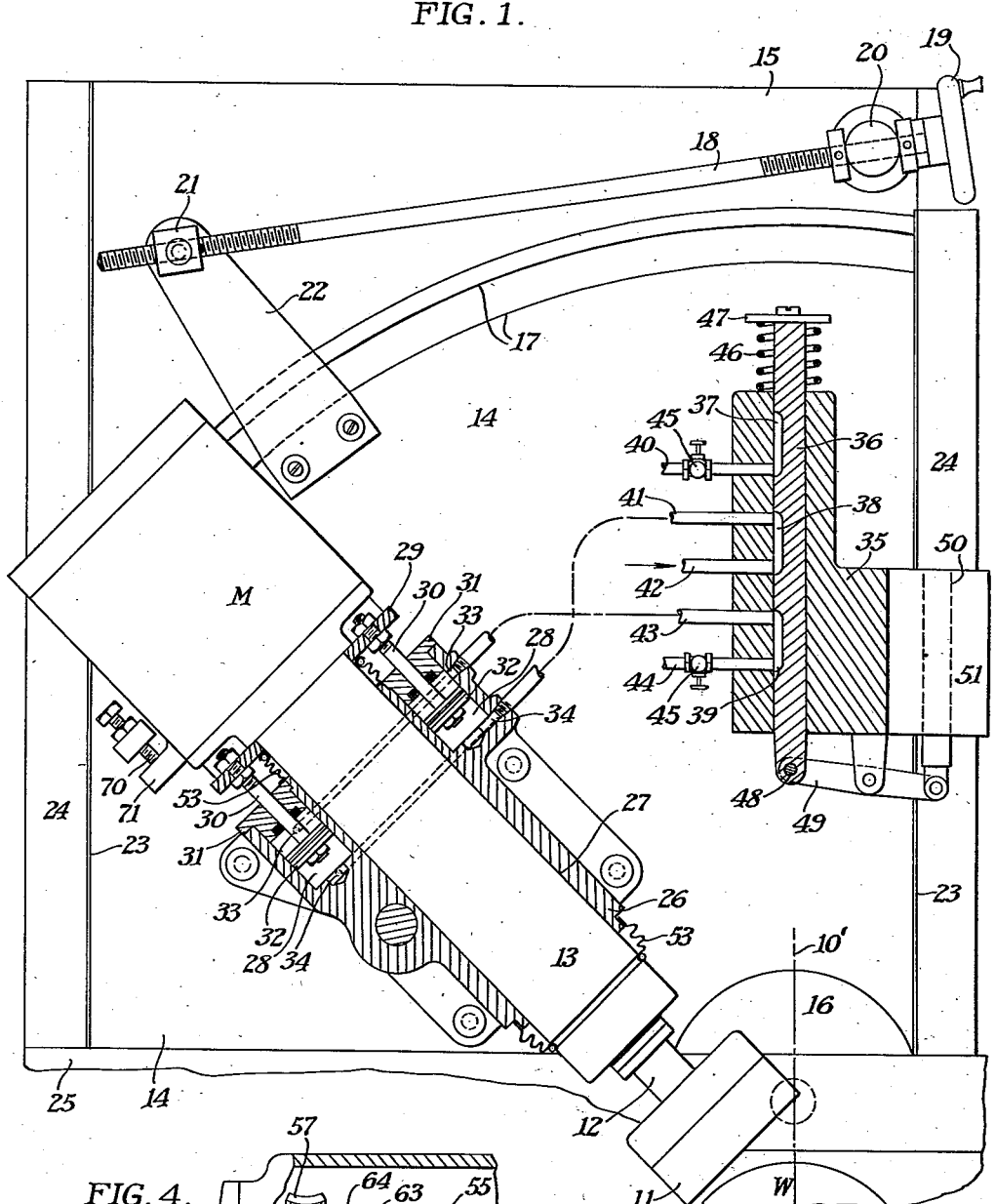

Oct. 16, 1951    J. R. TURNER ET AL    2,571,793
TOOL FEEDING MECHANISM FOR LENS GENERATORS
Filed May 10, 1949    2 SHEETS—SHEET 1

JOHN R. TURNER
GLENN H. BULLOCK
INVENTORS

BY
ATTORNEYS

JOHN R. TURNER
GLENN H. BULLOCK
INVENTORS
BY
ATTORNEYS

Patented Oct. 16, 1951

2,571,793

UNITED STATES PATENT OFFICE 2,571,793

TOOL FEEDING MECHANISM FOR LENS GENERATORS

John R. Turner and Glenn H. Bullock, Rochester, N. Y., assignors to Eastman Kodak Company, Rochester, N. Y., a corporation of New Jersey Application May 10, 1949, Serial No. 92,262

7 Claims. (Cl. 51—2)

This invention relates to apparatus for generating a given curve on a piece of work, and particularly to a lens generating machine for generating spherical surfaces on one or more lens blanks.

It is well known in the art to generate spherical surfaces on lenses and other forms of work by what are generally referred to as concentric generators. In these generators, the work is mounted on the end of a rotating spindle and an abrading tool in the form of a wheel is fixed to the end of a rotating spindle which is then fed toward the work by moving the tool spindle axially along a line disposed at an angle to the axis of the work spindle. The angle of inclination of the tool spindle relative to the work spindle varies with the radius of curvature to be generated and means are provided for making this adjustment. While the work could be fed toward the tool so long as it moved parallel to the tool spindle axis, or the two could be fed relatively toward each other, it is usually the simplest procedure to hold the work stationary, so far as translation is concerned, and to move only the tool tward the work.

With these generating machines it is customary to feed the tool into the work until it reaches a given point in its travel, at which point the work is known to come to test, or have the desired curve ground thereon, and then to back the tool off to place a new block of lenses on the work spindle. While the feed of the tool toward the work should be constant, it should not be positive, because then the feed might tend to feed the tool faster than it is cutting away the surface and the tool and/or work would be damaged. Accordingly, it is usual practice to put a constant pressure on the tool by air, springs, etc., which tend to feed it to the work and in which case the feed of the tool is really controlled by the rate at which the surface is cut away thereby. While this method of feeding the tool is desirable after the cutting action once starts, and while it is going along smoothly, it possesses certain definite disadvantages. For instance, up until the tool actually engages the work, it moves toward the work at an uncontrolled rate and may strike the work with sufficient impact to damage the work and/or the tool. Even though the initial travel of the tool into engagement with the work might be controlled in some way to avoid undesirable impact, there arise other conditions of this nature which are not controlled. For instance, if, during the grinding operation, the work becomes loose, the tool spindle and cutter may receive a heavy shock load which momentarily drives it back from the work. However, if the tool spindle is under a steady feeding pressure, the tool will drop down repeatedly against the work until the machine is stopped and, as a consequence, the tool and/or work may be damaged. Furthermore, due to the fact that diamond wheels ordinarily used in lens grinding will sometimes glaze over and fail to cut at their normal rate, mechanical tool spindle feeds are not satisfactory.

The primary object of the present invention is to provide a surface generating machine in which the grinding tool is fed toward the work with a tool spindle feeding mechanism which eliminates all of the disadvantages of existing machines as set forth above.

Another object is to provide a surface generator in which the tool spindle is fed toward the work under a controlled pressure, rather than being fed positively.

A further object is to provide the tool spindle feed with a mechanical limiter or hold-back for controlling the rate of feed of the tool up until the time the tool engages the work, after which it is automatically disconnected.

And yet, another object is to provide a mechanical limiter for the tool spindle feed which will allow the tool to freely back off from the work, due to shock loads, but which will immediately take over to bring it back into engagement with the work at a predetermined rate, rather than letting it bounce up and drop down repeatedly.

And still another object is to provide a mechanical limiter for the tool spindle which never acts to positively drive the spindle toward the work but acts only as a hold-back or speed governor for the spindle to prevent it from exceeding a speed of motion in the direction of feed, as determined by the speed at which the mechanical limiter is operated.

Figure 4:
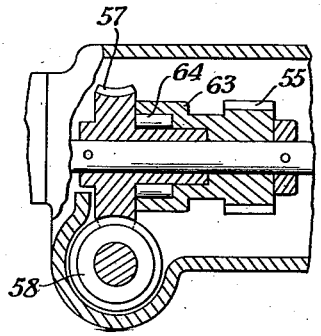
Figure 2:
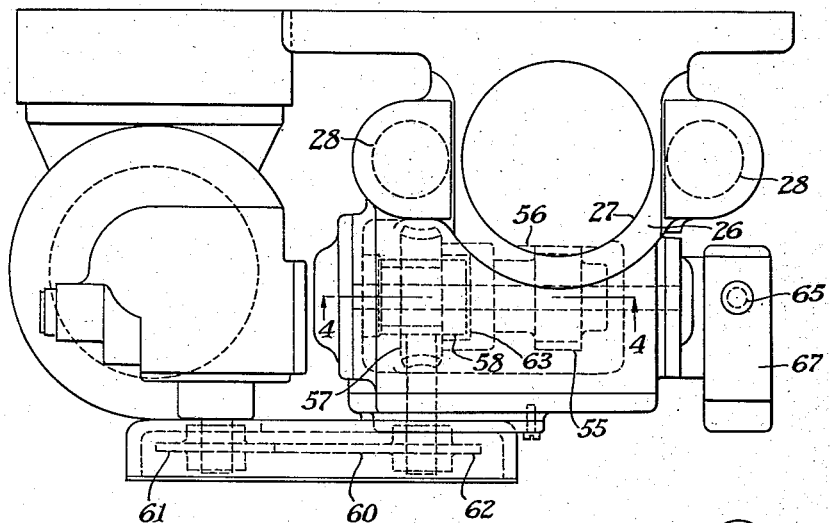
Figure 3:
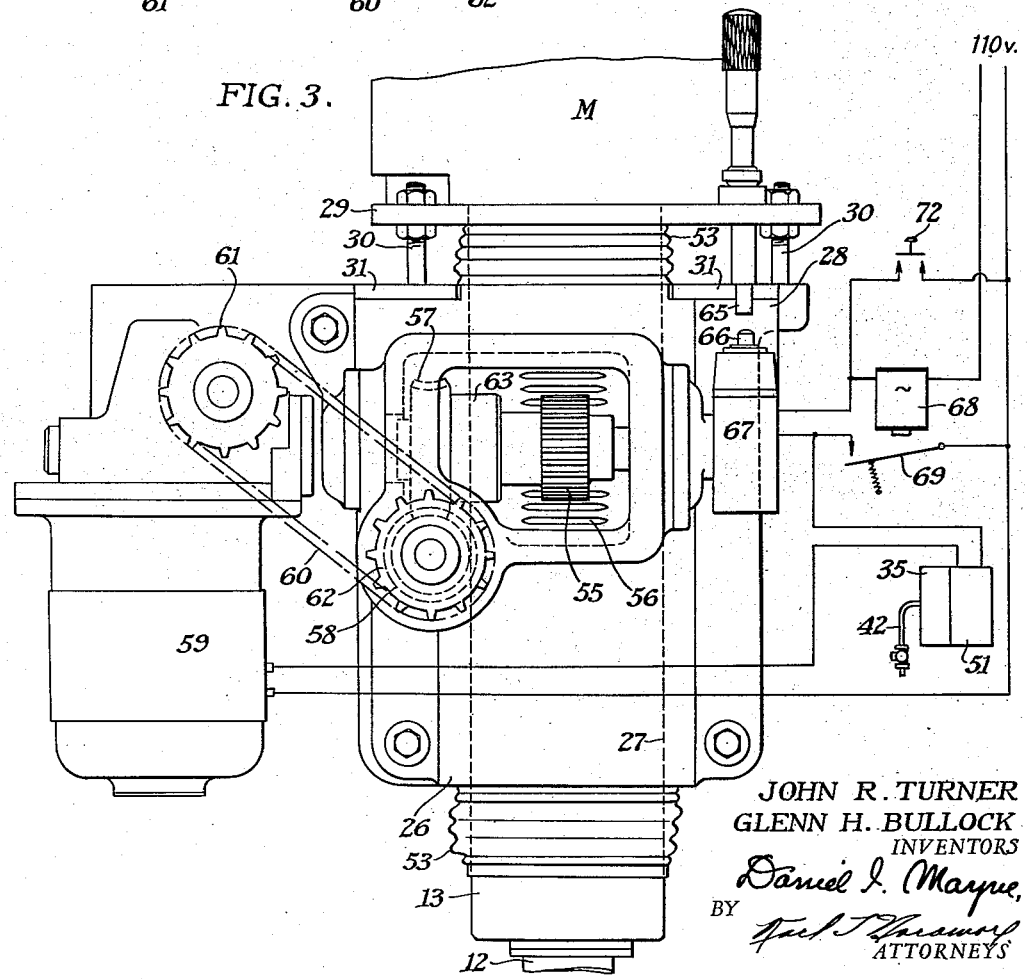

The novel features that we consider characteristic of our invention are set forth with particularity in the appended claims. The invention itself, however, both as to its organization and its methods of operation, together with additional objects and advantages thereof, will best be understood from the following description of specific embodiments when read in connection with the accompanying drawings, in which Fig. 1 is a front view of the upper end of a lens generating machine, partly in elevation and partly in section, and showing a tool spindle feed mechanism constructed in accordance with a preferred embodiment of the present invention;

Fig. 2 is a plan view showing the tool spindle from a position looking along the axis thereof and including the mechanical hold-back for the spindle;

Fig. 3 is a front elevational view of the apparatus shown in Fig. 2, and particularly showing the mechanical limiter, or hold-back, for the tool spindle, and including a diagrammatic showing of one form of electrical control circuit for the spindle feed; and Fig. 4 is an enlarged sectional view taken substantially on line 4—4 of Fig. 2 and showing the overrunning clutch in the mechanical hold-back.

Like reference characters refer to corresponding parts throughout the drawing.

Briefly, in accordance with the present invention, the tool spindle is normally fed toward the work under a controlled pressure by air, springs, etc., and a mechanical limiter or hold-back is connected to the tool spindle and is so designed as to control the rate at which the spindle is fed toward the work up until the time the tool actually engages the work. Or, stating it another way, the mechanical limiter acts as a governor to prevent the rate of travel of the spindle in the feeding direction from exceeding a predetermined value. So long as the tool spindle tends to travel in the feeding direction at a rate less than that dictated by the hold-back mechanism, then the hold-back is disconnected from the spindle. The same is true if the spindle moves in the opposite direction, or away from the work. Accordingly, this hold-back mechanism operates only to control the rate of feed of the spindle until the tool reaches the work, after which the pressure feed for the spindle is in sole control of the spindle during the actual abrading operation. Furthermore, this mechanical hold-back allows the spindle to be freely retracted from the work whether such retraction be intentional for reloading the work spindle, or be caused by accidental shock loads applied to the tool. In the latter instance, the mechanical hold-back takes over to prevent the tool from again dropping down onto the work with a damaging impact and thus overcomes a bouncing of the tool on the work.

Referring now to the drawings, our invention is shown as applied to a lens generating machine of the type wherein the work W, which may be a block of lenses or a single lens, is adapted to be mounted on a vertical rotatable spindle 10, only a portion of which is shown in broken lines in Fig. 1 because of lack of space, and having an axis 10' about which it is adapted to be rotated about this axis by any suitable means, not shown. The abrading tool 11, in the form of a wheel, is mounted on the end of a rotatable tool spindle 12 which is disposed above and inclined relative to the work spindle in accordance with the curvature of the surface to be generated on the work. This tool spindle is rotated by any suitable means, such as a motor M, connected directly to the end of the spindle, and to permit the tool spindle 12 to be moved axially while rotating the spindle is shown enclosed by a sleeve 13.

In order to abrade a piece of work, the tool spindle is moved from a retracted position, shown in Fig. 1, axially toward the work to bring the tool 11 into engagement with the work, and the feed of the tool and tool spindle is continued until the spindle reaches a given point in its travel where the surface being generated reaches the radius of curvature desired, or the surface is brought to test. The tool is moved to the retracted position to permit a change of work on the work spindle. So that the angle of inclination of the tool spindle may be altered to accommodate different radii of curvatures on different types of work, the tool spindle is mounted on an index plate 14 which is arcuately adjustable on a traverse plate 15 about a hub 16 whose center is in alignment with the axis of the work spindle. The traverse plate includes an arcuate guideway 17 with which a corresponding arcuate guide on the index plate 14 cooperates, and the adjacent edges of the two may be provided with a scale and index, not shown, to facilitate angular adjustment of the tool spindle for different jobs. Adjustment of the index plate 14 and the tool spindle 12 carried thereby is accomplished by turning screw 18 by handle 19, said screw being fixed to traverse plate 15 through a rotatable joint 20 and engaging a nut 21 rotatably mounted on the end of a bracket 22 fixed to and extending radially from the index plate.

It is not always practical to provide sufficient motion for the tool spindle to permit it to be retracted far enough from the work to permit a change of work on the spindle, especially when large blocks of lenses constitute the work. Accordingly, in order to facilitate a change of work on the spindle, it is customary to traverse the whole tool spindle and index plate vertically relative to the work after the tool has been retracted from the work. To this end, the traverse plate is provided with vertical guides 23 along each edge which slidably engage guideways 24 on the vertical edges of stationary supporting plate 25. Any suitable means, such as a double-acting air cylinder, not shown, can be provided for shifting the traverse plate and the tool spindle between a raised position, wherein the tool is sufficiently removed from the work to permit an interchange thereof on the work spindle, and a lowered position, wherein the tool spindle is in proper position to be fed axially toward the work to generate the desired curve thereon as shown in Fig. 1. Since in some instances the tool actually overhangs the lower edge of the work after it has generated its surface to test, it is necessary to back the tool away from the work before the traverse plate is moved to the raised position.

Coming now to the particular apparatus for feeding the tool spindle and tool axially toward and from the work, and in which apparatus the present invention lies, we prefer to move the tool spindle toward and from the work by means of air pressure. although other means such as spring pressure, hydraulic pressure, etc., may be used to move the tool under a controlled pressure, while any suitable means, mechanical or otherwise, may be used to retract it. Fixed to the index plate 14 is a support casting 26 having a finished bore 27 in which the sleeve 13 encasing the tool spindle is slidably mounted. The upper end of this casting 26 is provided with a pair of double-acting pneumatic cylinders 28 which are diametrically disposed on opposite sides of the bore. Fastened to a bracket 29 fixed to the end of the casing of the motor M are a pair of bolts 30 which extend through openings in the caps 31 of the cylinders 28 and have pistons 32 fixed to the lower end thereof. Foreign matter, such as loose abrasive, is kept out of the bore 27 in the casting 26 and away from that portion of the sleeve which slidably engages said bore, by means of a pair of flexible protecting sleeves 53 which are connected between the sleeve 13 and the top and bottom of the bore 27 of the casting 26.

The wall of each cylinder is provided with a pair of ports 33 and 34 to permit air under pressure to be admitted at either side of the piston and thus make the cylinder double acting. When air is supplied to the upper ports of each cylinder and the other ports 34 are connected to exhaust them, the tool spindle is fed axially towards the work. When the air connections are reversed, the tool spindle is retracted from the work. The admission of air to the air cylinders is controlled by a slide-type valve 35 which includes a slide 36 having three passages, 37, 38, and 39. Connected into the side wall of the valve are five pipe lines 40, 41, 42, 43, and 44. Pipes 40 and 44 are merely exhaust lines and each includes an adjustable valve 45 to control the rate of exhaust of air from the air cylinders 28. Line 41 connects with ports 34 at the top of the air cylinders 28 and line 43 connects with ports 33 at the bottom of the air cylinders. Pipe line 42 is connected to an air compressor, or other source of air under pressure. Slide 36 of valve 35 is normally moved to the raised position shown in Fig. 1 by a compression spring 46 encircling the end of the slide and confined between the top surface of the valve and a washer 47 connected to the end of the slide. In this position of the slide 36 passage 38 connects pipe line 41 with supply line 42, so that air is put into ports 34 at the bottom of cylinders 28 and the tool spindle is raised, or retracted, from the work. At the same time, pipe line 43 is connected by passage 39 to exhaust line 44 so that air can be exhausted from the top of the cylinders 28 at a controlled rate.

When the slide 36 is moved to its lower position, passage 37 theerin connects exhaust line 40 to line 41; passage 38 connects supply line 42 to line 43, and passage 39 becomes ineffective. In this position of the valve, which we will refer to as the open position, air is admitted to the top of the cylinders 28, and air is exhausted from the bottom of the cylinders so that the tool spindle is fed toward the work under controlled pressure. While this valve 35 may be operated in any suitable manner, we have chosen to show it as a solenoid valve wherein the lower end of the slide is pivoted at 48 to one end of a pivoted beam 49, and to the other end of which is pivoted an armature 50 slidably mounted in the coil 51 of the solenoid. When the coil of the solenoid is energized, the armature is drawn upwardly by magnetic force to pull the slide 36 of the valve to its lower position and open the valve. When the coil of the solenoid is deenergized, the spring 46 takes over to move the slide 36 to its raised position and close the valve.

In order to prevent the tool spindle from moving rapidly toward the work and bring the tool into engagement with the work with damaging impact when the valve 35 is opened, and to allow the spindle to be readily retracted from the work at any time, a mechanical limiter or hold-back for the tool spindle is provided, and which we will now describe. This mechanical limiter or hold-back comprises a pinion 55 engaging a rack 56 running longitudinally of the sleeve 13 of the tool spindle. This pinion is capable of being driven by a worm wheel 57 which is driven by a worm 58, and which is, in turn, driven by a motor 59 through the medium of a chain 60 engaging a sprocket 61 connected to the motor shaft through a suitable reduction gearing, not shown, and a sprocket 62 on the end of the shaft carrying the worm.

The driving connection between the worm wheel 57 and the pinion 55 is an overrunning clutch 63 of the type which comprises a plurality of rollers or balls 64 running in cam slots formed in either the driving or driven member of the clutch, as is well known and as indicated in Fig. 4. As is well known in the art, a characteristic of this type of clutch is that a positive driving connection is effected between the clutch members only when the driven member is rotated in one direction relative to the driving member, and then only when the driven member tends to rotate at a speed different from that of the driving member. In the present hold-back mechanism the overrunning clutch is so arranged that it will positively engage and connect the pinion to the worm wheel whenever the tool spindle sleeve 13 and the rack 56 carried thereby tends to drive the pinion faster than the worm wheel does. Inasmuch as the spindle is normally forced toward the work at an uncontrollable rate by air pressure in the cylinders 28, this condition of drive will exist at all times during the feeding stroke of the spindle up until the time the tool actually engages the work.

After the tool engages the work, the tool spindle no longer attempts to feed forward faster than the rate determined by the speed of the hold-back mechanism, so that the clutch 63 disconnects the hold-back from the pinion and the tool spindle. Then, the only driving pressure applied to the tool is that supplied by the air acting on the pistons 32, which, incidentally, can be controlled, and the feed of the tool is dependent upon the rate at which the tool wears away the surface of the work. Should the tool be subjected to an accidental shock load at any time during the abrading operation, because of any unusual occurrence, such as the work coming loose, or the tool breaking, etc., the spindle is free to retract under the action of such a load, since the overrunning clutch is ineffective in this direction of movement of the spindle. However, should the spindle be retracted due to an accidental shock load, the overrunning clutch will prevent it from again dropping down onto the work with a damaging impact because then the air pressure will attempt to feed the spindle back toward the work at a rate of speed in excess of that determined by the speed of the hold-back and the clutch 63 will engage. This will mean that the hold-back will then take over to regulate the rate of feed of the spindle back toward the work. This delay will give the work a chance to clear itself of any obstruction causing the difficulty, or will allow the operator to shut off the machine and take care of the difficulty.

At no time is the hold-back mechanism actually driving the tool spindle toward the work, but it is merely acting as a mechanical hold-back. Accordingly, the motor 59 need be only a small one, since little actual power is required from it. It will be understood that the speed of the motor 59 and/or the ratio of the gearing in the hold-back mechanism will be chosen to give the desired predetermined rate of feed for the tool spindle.

When the tool spindle has advanced to a set point in the grind to produce the desired curve, it is desirable to automatically stop the spindle feed and retract the spindle from the work. While it is not necessary to stop the hold-back mechanism at this time because the overrunning clutch allows unhampered retraction of the tool spindle, we choose to stop the hold-back during the time the tool spindle is being retracted, since to let it run is merely a waste of electricity and involves unnecessary wear on the mechanism.

Inasmuch as the down feed of the tool spindle is prevented whenever the motor 59 is stopped, this permits a dwell to be used to clean up the grind as is desirable when a heavy cut has been taken. This can be done by having the opening of a microswitch (to be later described) stop the hold-back motor 59 and then actuate the solenoid valve 35 through a time delay relay.

In order to automatically control the feeding and retracting of the tool spindle in proper timed relation, we mount a micrometer screw 65 on the bracket 29 which is adapted to strike the operating button 66 of a normally closed switch 67 and open the switch when a set point in the grind is reached. Opening of this switch breaks the circuit to the coil 68 of a holding relay, allowing switch 69 of the relay to open and cut off the current from the motor 59 and the coil 51 of the solenoid valve. This results in the valve 35 being moved to a closed position by a spring 46 and in which position air is introduced into the lower end of cylinders 28 and exhausted from the upper end, and the tool spindle is moved to a retracted position. An adjustable stop screw 70 on the index plate 14 is adapted to engage a lug 71 extending from the casing of motor M to limit the return travel of the tool spindle to its retracted position. When the finished piece of work is removed from the work spindle, and is replaced by a new piece of work, it is only necessary to momentarily press the normally open start switch 72 to place the machine in operation. Momentary closing of start switch 72 connects the coil 68 of the holding relay to the 110-v. line and causes the relay to pull in and close its switch 69. This connects the motor 59 and the coil 51 of the solenoid valves to the 110-v. line and thus starts the mechanical hold-back mechanism and applies air to the double-acting cylinders 28 in a manner to feed the tool spindle toward the work at a controlled rate. After the holding relay is once pulled in, the start switch 72 may be released, since closing of switch 69 connects the coil 68 of the relay into the power line and keeps it energized.

In the event it is found necessary or desirable to raise the traverse plate 15 in order to move the tool away from the work spindle sufficiently to afford room for work replacement, the traverse plate may be connected with a double acting air cylinder, not shown, so that it can be raised and lowered. Then, if the feed of air to this cylinder is controlled by a solenoid valve, not shown, it can be connected in the circuit disclosed in such a way as to be automatically operated in timed relation with solenoid valve 35. For instance, since in some cases it is desired to retract the tool from the work along its own axis before the tool is raised vertically, there should be a time delay relay in the circuit of the valve controlling the movement of the traverse plate so that the tool would be retracted axially from the work to a sufficient extent before the traverse plate is started upwardly. Under these conditions, the start switch 72 could be closed by the traverse plate 15 when it reached its lower position and the tool spindle was again in proper position for the axial feed to begin.

From the above description of our novel tool spindle feeding mechanism, it will be understood that whenever the tool is actually engaging the work and performing the abrading operation, the spindle is normally being urged toward the work by air pressure, and the rate at which the work is worn away determines the rate of feed of the tool. This is just the condition desired. However, at all times that the spindle is moving toward the work and the tool is not actually engaging the work, the mechanical hold-back retards the spindle to a rate of movement determined by its speed of operation. The hold-back never hinders free movement of the tool spindle in a direction of movement away from the work. In reality, the hold-back mechanism acts only as a governor to prevent the tool spindle from feeding forward at a rate in excess of a given rate, since at no time does the hold-back actually act as a drive to move the spindle forward.

Although we have shown and described certain specific embodiments of our invention, we are fully aware that many modifications are possible. Our invention, therefore, is not to be restricted to the precise details of construction shown and described, but is intended to cover all embodiments coming within the scope of the appended claims.

Having thus described our invention, what we claim as new and desire to secure by Letters Patent of the United States is:

1. In a surface generating apparatus the combination with a base a rotatable work spindle on the end of which a piece of work to be abraded is adapted to be mounted, a rotatable tool spindle, and abrading tool on the end of said tool spindle, a carrier rotatably supporting said tool spindle and slidably mounted on said base to move said spindle axially toward and away from the work spindle to move the tool into and out of engagement with said work, and means normally urging said carrier toward said work spindle at an excessive rate, of a governor mechanism for limiting the rate of movement of said carrier toward said work spindle and including a part positively connected to said carrier at all times, a continuously-driven member, and an overrunning clutch between said part and said member arranged to drivingly connect the two when said carrier moves toward the work at a rate in excess of that determined by the speed of said continuously-driven member.

2. In a surface generating apparatus the combination with a base a rotatable work spindle on the end of which a piece of work to be abraded is adapted to be mounted, a rotatable tool spindle, and abrading tool on the end of said tool spindle, a carrier rotatably supporting said tool spindle and slidably mounted on said base to permit movement of said spindle axially toward and away from the work spindle to bring the tool into and out of engagement with said work, and means normally urging said carrier and tool spindle toward said work spindle at an excessive rate, of a hold-back mechanism for positively preventing said carrier from moving toward said work at a rate in excess of a predetermined value and including a prime mover driven at a predetermined rate, a gear drivingly engaging said carrier and an overrunning clutch between said prime mover and said gear arranged to disconnect the two at all times when said carrier is not tending to feed toward the work spindle at a rate in excess of that dictated by the predetermined rate of said prime mover.

3. In a surface generating apparatus the combination with a base a rotatable work spindle on the end of which a piece of work to be abraded is adapted to be mounted, a rotatable tool spindle, and abrading tool on the end of said tool spindle, a carrier rotatably supporting said tool spindle and slidably mounted on said base to permit said spindle to be fed toward and away from the work spindle to bring the tool into and out of engagement with said work, and means normally urging said tool spindle toward said work spindle at an excessive rate, of a hold-back mechanism connected to said carrier to control its rate of movement in the direction of feed, and including a rack connected to said carrier to move therewith, a pinion engaging said rack, means for driving said pinion at a predetermined rate, the driving means for said pinion including a prime mover rotated at a predetermined rate and an overrunning clutch between said prime mover and said pinion is so arranged as to connect said prime mover to said pinion only when said tool spindle is moving toward said work spindle and when tending to so move at a rate in excess of that determined by the rate of said prime mover.

4. In a surface generating apparatus the combination of a base a rotatable work support on the end of which a piece of work to be abraded is adapted to be mounted, a rotatable tool spindle, an abrading tool on the end of said spindle, a sleeve slidably supporting said spindle on said base whereby it may be fed axially toward and retracted from the work support to move the tool into and out of engagement with said work, while rotating, fluid-operated means for normally feeding said spindle toward the work at an excessive rate through the use of fluid under pressure, a valve movable between an open position, wherein it introduces fluid under pressure to said last-mentioned means, and a closed position, wherein it exhausts said last-mentioned means, a hold-back mechanism for preventing said spindle from moving toward the work at a rate in excess of a predetermined rate but allowing the spindle to be forced toward the work by the fluid-operating means when its movement is at a rate less than said predetermined rate and allowing said spindle to move freely in the direction from the work, said hold-back mechanism including a member geared to said sleeve to be rotated in a given direction by sliding movement thereof toward the work, a prime mover rotating at a predetermined rate in the same given direction as said member, and an overrunning clutch between said member and said prime mover adapted to positively connect said member to said prime mover when the member is rotated in said given direction faster than said prime mover and disengage said member from said prime mover at all other times.

5. A surface generating machine according to claim 4 including means for closing said valve and stopping said prime mover at the instant said spindle reaches a given point in its feeding stroke.

6. A surface generating machine according to claim 4 in which said valve is solenoid operated and said prime mover is an electric motor, said solenoid and said motor connected in circuit so that when the circuit is complete the solenoid is energized to open said valve and said motor is energized, a normally closed switch in said circuit, and means carried by said spindle to open said switch when said spindle reaches a given point in its feeding stroke.

7. In a surface generating apparatus the combination of a base a rotatable work support on which a piece of work to be abraded is adapted to be mounted, a rotatable tool spindle, an abrading tool on the end of said spindle, means slidably supporting said spindle on said base whereby it may be fed axially toward and retracted from the work while rotating, means for feeding the spindle toward and from the work by air under pressure and including an air cylinder into opposite ends of which air under pressure may be fed or exhausted, a valve in the air line and having an open position, wherein it admits air into the end of the cylinder to feed the spindle toward the work and opens the other end to exhaust, and a closed position, wherein the air is admitted to the other end of the cylinder to retract the spindle, a hold-back mechanism geared to said spindle supporting means, including a motor operating at a predetermined rate a pinion geared to said supporting means to be rotated by axial movement thereof, and an overrunning clutch between said motor and pinion adapted to disconnect said hold-back from the spindle supporting means at all times when said spindle is not tending to feed toward the work at a rate in excess of that dictated by the predetermined rate at which the motor is driving, and means operated in response to said spindle reaching a given point in its feed toward the work for moving said valve to its closed position and stopping the motor of said hold-back mechanism.

JOHN R. TURNER.
GLENN H. BULLOCK.

REFERENCES CITED

The following references are of record in the file of this patent:

UNITED STATES PATENTS

| Number | Name | Date |
| --- | --- | --- |
| 1,933,373 | Fraser | Oct. 31, 1933 |
| 2,023,841 | Kingsbury | Dec. 10, 1935 |
| 2,033,922 | Cole | May 17, 1936 |
| 2,053,398 | Kingsbury | Sept. 8, 1936 |
| 2,114,389 | Kingsbury | Apr. 19, 1938 |